United States Patent
Brockway et al.

(10) Patent No.: US 10,832,420 B2
(45) Date of Patent: *Nov. 10, 2020

(54) DYNAMIC LOCAL REGISTRATION SYSTEM AND METHOD

(71) Applicant: MIM Software Inc., Cleveland, OH (US)

(72) Inventors: Jerimy Brockway, Aurora, OH (US); Jonathan William Piper, Orange, OH (US)

(73) Assignee: MIM SOFTWARE, INC., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,809

(22) Filed: Dec. 11, 2017

(65) Prior Publication Data

US 2018/0374224 A1 Dec. 27, 2018

Related U.S. Application Data

(60) Continuation of application No. 14/683,330, filed on Apr. 10, 2015, now Pat. No. 9,842,398, which is a division of application No. 13/624,827, filed on Sep. 21, 2012, now abandoned.

(51) Int. Cl.
    *G06T 7/33* (2017.01)
    *G06T 7/30* (2017.01)
    *G06T 7/00* (2017.01)

(52) U.S. Cl.
    CPC .............. *G06T 7/33* (2017.01); *G06T 7/0012* (2013.01); *G06T 7/30* (2017.01); *G06T 7/337* (2017.01); *G06T 2207/10072* (2013.01); *G06T 2207/20048* (2013.01); *G06T 2207/20092* (2013.01); *G06T 2210/41* (2013.01)

(58) Field of Classification Search
    CPC . G06T 2207/10072; G06T 2207/20048; G06T 2207/20092; G06T 2210/41; G06T 7/0012; G06T 7/30; G06T 7/33; G06T 7/337
    See application file for complete search history.

(56) References Cited

U.S. PATENT DOCUMENTS

| | | | |
|---|---|---|---|
| 2011/0200227 A1* | 8/2011 | Bogoni | G06F 19/321 382/103 |
| 2013/0182925 A1* | 7/2013 | Razeto | A61B 6/03 382/131 |

* cited by examiner

*Primary Examiner* — Nirav G Patel
(74) *Attorney, Agent, or Firm* — Tucker Ellis LLP; Evan T. Perry

(57) ABSTRACT

In accordance with the teachings described herein, systems and methods are provided for generating images for use in systems, e.g., imaging systems. The method includes receiving at least a first set of images, providing a first registration, providing a display, and displaying a first image on said display. Further, the method includes providing a user interface, providing a second registration, and displaying a second image in said user interface. Further, the systems include an image database, a display, and a registration engine. The registration engine includes software instructions stored in at least one memory device and executable by one or more processors.

18 Claims, 9 Drawing Sheets

DYNAMIC LOCAL REGISTRATION SYSTEM AND METHOD

CROSS-REFERENCE TO RELATED APPLICATIONS

This application is a continuation of U.S. patent application Ser. No. 14/683,330, filed Apr. 10, 2015. Application Ser. No. 14/683,330 is a divisional of U.S. patent application Ser. No. 13/624,827, filed Sep. 21, 2012, entitled "DYNAMIC LOCAL REGISTRATION SYSTEM AND METHOD". The entireties of the aforementioned applications are incorporated herein by reference.

TECHNICAL FIELD

The present invention relates generally to the field of image processing and more particularly to image registration.

BACKGROUND

Three dimensional medical scans of patients, such as CT (computed tomography), MR (magnetic resonance), US (ultra sound), or PET (positron emission tomography), produce a series of two dimensional (2D) image slices that together make up 3D images. The two dimensional image slices can be stored to create a set of primary or target images. A medical professional may take another set of images of the patient that can be stored in memory to create a set of secondary or source images. These secondary or source images may be compared with the primary or target images, for example, and processed through an image registration to define a point to point correlation between the primary and the secondary images. However, image registrations, particularly high order registrations including deformable registrations, of any volume may be difficult to interpret and evaluate for accuracy, and doing so can be time consuming for medical professionals.

The aforementioned difficulty in understanding and evaluation of registrations is not ideal. Accordingly, a new system and method is desired.

SUMMARY

In accordance with the teachings described herein, systems and methods are provided for generating images for use in systems, e.g., imaging systems. In one example, the method may include receiving at least a first set of images, providing a first registration, providing a display, displaying a first image on said display, providing a user interface, providing a second registration, and displaying a second image in said user interface. In one example, the system may include an image database, a display, a registration engine, wherein at least said registration engine comprise software instructions stored in at least one memory device and executable by one or more processors.

The features, functions, and advantages discussed can be achieved independently in various embodiments of the present invention or may be combined in yet other embodiments, further details of which can be seen with reference to the following description and drawings.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Figure 1:
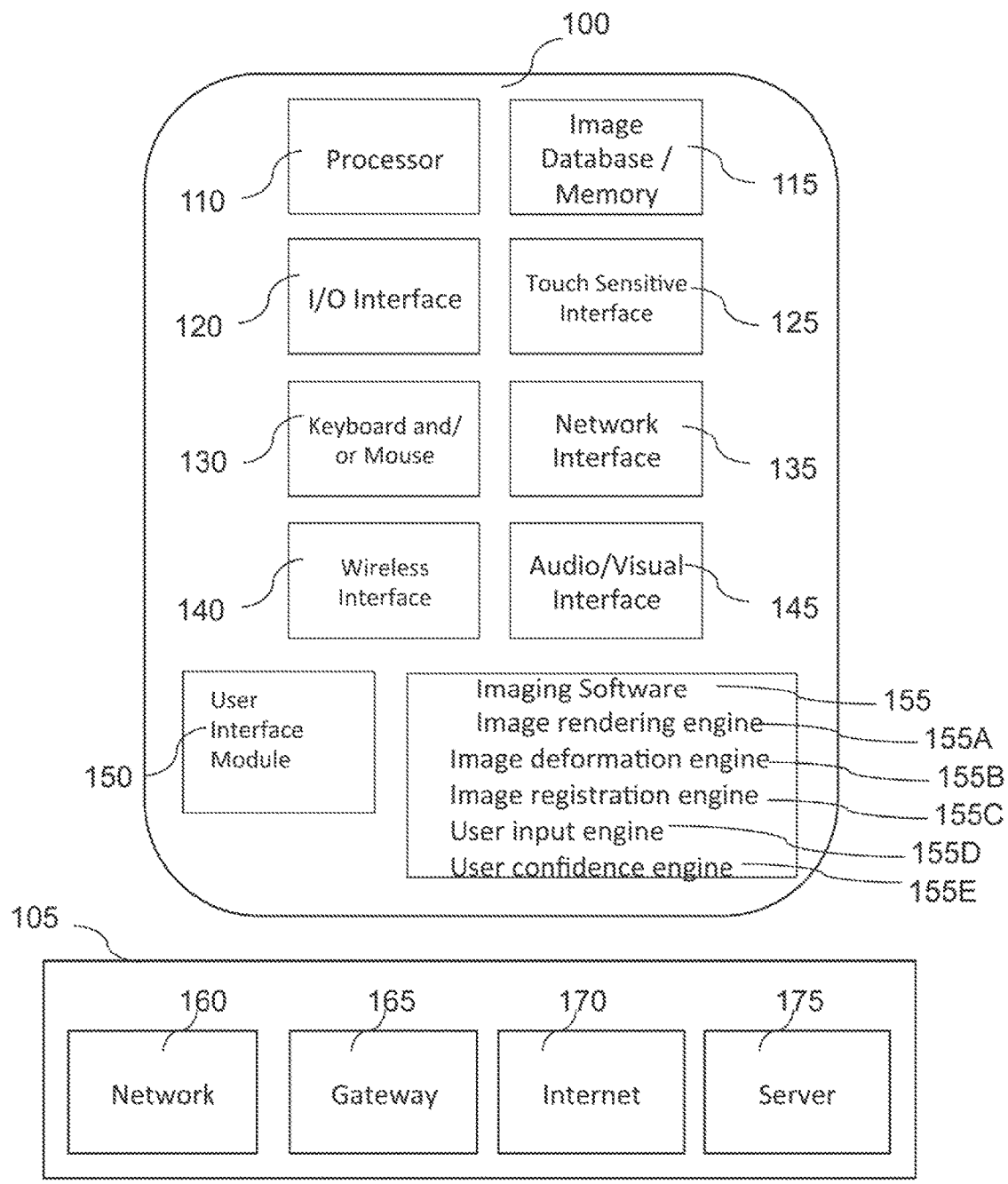
FIG. 1 is a computer device and operating environment according to one or more aspects described herein.

FIG. 1 illustrates an example computer device 100 and operating environment 105 according to at least one aspect described herein. Computer device 100 may be in the form of a desktop computer, a laptop computer, a tablet computer, a server, a cellular device, a mobile phone, a mobile computer, a mobile device, a handheld device, a media player, a personal digital assistant or the like, including a combination of two or more of these items. In the illustrated embodiment, computer device 100 may include one or more software and/or hardware components, including processor 110, image database/memory 115, input-output (I/O) interface 120, an optional touch sensitive interface 125, keyboard and/or mouse 130, network interface 135, optional wireless interface 140, audio and/or visual interface 145, user interface module 150, and imaging software 155. In another embodiment, the computer device includes one or more of these components to form one of the computer devices discussed above. In yet another embodiment, the computer device includes one or more of these components in addition to other components. In another embodiment, the computer device may include more or fewer components than shown or have a different configuration of components. For example, the computer device may have two or more of each of these components, e.g., two or more processors, image database/memories, I/O interfaces, and/or user interface modules. Although user interface module 150 is illustrated as a separate component in computer device 100, in another embodiment the user interface module 150 may be part of one or more other components, e.g., image database/memory 115. The components illustrated in FIG. 1 may be implemented in hardware, software or a combination of both hardware and software.

The imaging software 155 may include at least one image rendering engine 155A, at least one image deformation engine 155B, at least one registration engine 155C or algorithm, at least one user input engine 155D, and at least one user confidence engine 155E. In another embodiment, the imaging software may include at least one registration evaluation engine. It should be understood that the at least one image deformation engine, the at least one image rendering engine, and the at least one registration engine or algorithm, at least one user input engine, and at least one user confidence engine as described herein, may be implemented by software instructions executing on one or more processing devices. In another embodiment, however, one or more operations of these software engines may instead be performed by other known mechanisms such as firmware or even appropriately designed hardware. The image database/memory 115, as described herein, may be implemented using one or more memory devices. For instance, in one example the image database may be implemented within a memory device that contains another database and/or the like, and in another example the image database may be implanted on a stand-alone or separate memory device. As discussed below in greater detail, the medical images are loaded into the image database/memory 115 for computing registrations and for quality evaluation that can be used by the user to more easily evaluate registrations that are often very complex for a user to understand. The plurality of medical images may include a set of two-dimensional (2D) slices that are received, for example, from a CT scanner or other system for capturing three-dimensional (3D) medical images, such that the set of 2D slices together represent a 3D medical image. In other examples, the plurality of medical images slices could be virtual, such as sagittal, coronal, or axial images (or any other slicing angle through the image data). In another embodiment, the plurality of images may be used for two dimensional analysis.

In the illustrated embodiment, operating environment 105 may include network 160, gateway 165, internet 170, and/or server 175. Operating environment may include any type and/or number of networks, including wired or wireless internet, cellular network, satellite network, local area network, wide area network, public telephone network, cloud network, and/or the like. In another embodiment, the operating environment operates locally on the computer device. In the illustrated embodiment, computer device 100 may communicate with operating environment 105 through server 175 by a wireless network connection and/or a wired network connection. Further, server 175 may connect computer device 100 to the public telephone network to enable telephone functionality (voice and data) of the computer device 100.

A computer device 100 and operating environment 105 illustrate one possible hardware configuration to support the systems and methods described herein, including at least the methods 900-1200 discussed below. In order to provide additional context for various aspects of the present invention, the following discussion is intended to provide a brief, general description of a suitable computing environment in which the various aspects of the present invention may be implemented. Those skilled in the art will recognize that the invention also may be implemented in combination with other program modules and/or as a combination of hardware and software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

The computer device 100 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM) or any memory known by one skilled in the art. A basic input/output system (BIOS), containing the basic routines that help to transfer information between elements within the computer device 100, such as during start-up, is stored in the ROM.

The computer device 100 can further include a hard disk drive, a magnetic disk drive, e.g., to read from or write to a removable disk, and an optical disk drive, e.g., for reading a CD-ROM disk or to read from or write to other optical media. The computer device 100 can include at least some form of computer readable media. Computer readable media can be any available media that can be accessed by the computer device. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer device 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the computer device 100 can be any of a number of commercially available operating systems and/or web client systems.

In addition, a user may enter commands and information into the computer device through a touch screen and/or keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an SR interface, and/or various wireless technologies. A monitor or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display can be employed with the computer device 100 to present data that is electronically received from the processing unit. In addition to the descriptions provided elsewhere, for example, the display can be an LPD, LCD, plasma, CRT, etc. monitor that presents data electronically. The display may be integrated with computer device 100 and/or may be a stand-alone display. Alternatively or in addition, the display can present received data in a hard copy format such as a printer, facsimile, plotter etc. The display can present data in any color and can receive data from the computer device 100 via any wireless or hard wire protocol and/or standard.

The computer device can operate in a networked environment using logical and/or physical connections to one or more remote computers/devices, such as a remote computer(s). The remote computer(s)/device(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer device is connected to the local network through a network interface or adapter. When used in a WAN networking environment, the computer device typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 2:
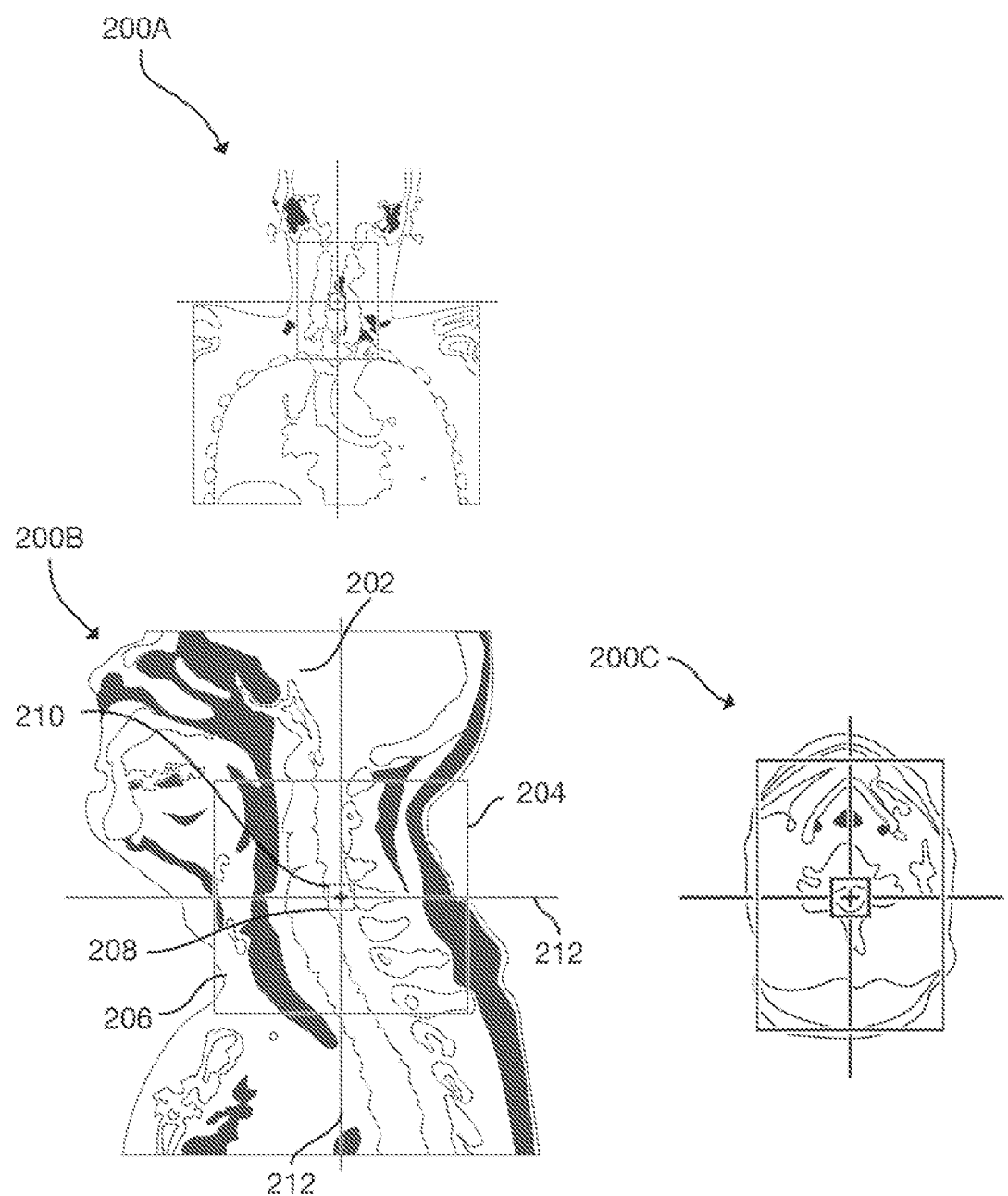
FIG. 2 is an example of a software program displaying multiple images on a computer system display that may be generated by the systems and methods described herein.

FIG. 2 illustrates a series of images 200A-C, e.g., medical images and/or other images, that may be generated and/or displayed by the systems and methods described herein. In another embodiment, other categories of images may be used in the system described herein, e.g., satellite imaging, photographs, microscopy, and the like. Image 200A is a coronal view, image 200B is a sagittal view, and image 200C is an axial or transaxial view of a portion of a patient. Images 200A-C may include portions of a number of muscles, bones, fat, organs, other tissues, implants, other elements, and the like. As discussed above, any image or combination of images in two, three, or more dimensions may be used and/or displayed in the systems and methods described herein. In another embodiment, less than or more than three images may be displayed. For purposes of the description below, a single image, two images, or more may be discussed and presented in the figures to describe exemplary embodiments and features of the systems and methods described herein. However, one skilled in the art will appreciate that any number of images and dimensionality of imaging may be included in the exemplary embodiments and features discussed herein.

Further in FIG. 2, medical image 200B includes a first image 202 and a spyglass 204. A spyglass is defined as an interface overlay, any other view, or any other method of displaying images that may be displayed in conjunction with at least one other image, e.g., a first image. In another embodiment, the spyglass may be displayed alone. The first image 202 is a primary image, however, in another embodiment the first image may be a secondary or any other type of image. In another embodiment, the first image 202 could be a graphical representation of anatomical boundaries or segmented regions or any other abstraction of an image or a combination of at least one such abstraction and an image. In another embodiment, the overlay or spyglass could be the same size as or larger than the whole display, therefore, the first image may not be visible. In the illustrated embodiment of FIG. 2, overlay 204 is displayed as a square shaped user interface, however, in another embodiment the overlay may be configured as a user interface having another shape and/or graphic, e.g., a circle, triangle, star, and the like. Although the overlay is displayed as a square shaped user interface in the two dimensional image(s), e.g., image 200B, the overlay is derived from a three dimensional cube that is displayed as a two dimensional overlay or square in at least one image. In another embodiment, the systems and methods described herein may include an alternative overlay or spyglass, for example a spherical or globe shape, a pyramid shape, and the like. In still another embodiment, these shapes may exist in more than three dimensions or displayed in more than two dimensions.

In the illustrated embodiment, overlay 204 is a graphical user interface that displays a second image 206 having a localization point 208 (represented in the figure by a plus (+)) surrounded by a localization region or neighborhood 210. For example, the localization point 208 may be at the center of a localization region or neighborhood 210 having a 5×5×5 voxel volume or alternatively may be a 1×1×1, 2×2×2, 3×3×3, or 4×4×4 voxel volume. In another embodiment, the localization region or neighborhood may be larger than a 5×5×5 voxel volume. In still another embodiment, the localization region or neighborhood may be a different shape, such as a sphere, circle, or square. The overlay 204 may further include first and second axes 212 which extend from localization point 208 past the perimeter of the overlay 204 to first image 202. Overlay 204 is described as a user interface because a software user can use a computer input, e.g., a mouse, touch screen, keyboard, and the like, as an input to the software to change location of the overlay 204 and the localization point 208, provide input and/or instructions to the software, select different modes of display or interaction, and to record qualitative comments and quantitative metrics regarding dynamically selected localization point(s) for the various embodiment image(s) as discussed further herein. Of course, one skilled in the art of software appreciates that other user interfaces and the like may be included with the images discussed and illustrated herein, e.g., companion controls, color bars or side panels that provide some of the control discussed herein.

In the illustrated embodiment of FIG. 2, the second image 206 displays the portion of the primary that is below the overlay 204. As discussed further herein, the overlay may display another image, including but not limited to a secondary image, a blended image, a registration or an image after applying a registration to the image, including but not limited to a deformable registration and a rigid local registration, an image representing properties or aspects of a registration, an image that includes a checker display including at least a portion of an image or a registration, an overlay that includes vector renderings which indicate direction and magnitude of registration displacements, an image that includes a heat map display indicating a difference between two or more registrations, an image that includes a subtraction display indicating a difference between two or more images, or another type of image or overlay which displays an aspect of at least one registration or image, an aspect of a comparison between two or more registrations, or an aspect of a comparison between two or more images.

An image processed through a complex or higher order registration, such as deformable registration, may be difficult for a user to understand and rely on because of the difficulty of inspecting the registration for the purpose of gaining confidence that the registration is correct or at least portions of the registration are correct, e.g., it is difficult for user to perceive whether a voxel in bone or other tissue in the primary image is the same voxel in bone or other tissue in the secondary image. For example, a point may go virtually anywhere in a deformable registration because it can have many degrees of freedom, making it hard for a user to determine the quality and/or reliability of the registration. And in fact, a single registration may be accurate in some areas and inaccurate in other areas. In some cases, these registrations may have more than a million degrees of freedom. For all of these reasons, the user reviewing images processed with higher order registrations may not have a high level of confidence in the quality of the registration(s). This makes communication between one user who reviews images and assesses an image and/or registration quality (such as a physicist in radiation oncology department or imaging lab) and another user who may review image results and prescribe a patient diagnosis or treatment plan (such as a physician) especially inefficient and difficult. On the other hand, local rigid registrations have six degrees of freedom (3 in translation and 3 in rotation) and may be reviewed and understood, visually or otherwise, by a user with a higher level of confidence. Additionally, it is easier to perceive accurate point-by-point mapping and correlation through these simpler registrations that display clearly understandable context around each point. Therefore, as an example, in the systems and methods described herein, the higher order registrations may be approximated by a best fit local rigid registration and the secondary image processed through the best fit local rigid registration for each localization point selected by the user. If the best fit local rigid registration is determined to be acceptable by the user, the user will have a higher level of confidence that the higher order registration close to the localization point has a good level of quality, e.g, the points in each image near the localization do indeed correlate, and the image processed with the higher order registration may likely be relied on by the user, e.g., the physicist and/or the physician. On the other hand, if the best fit local rigid registration is determined to be unacceptable to the user, the user may record this as a bad result, rerun the registration in order to improve the local area, or reject the result in this area.

FIGS. 3A-3D illustrate a series of images 300A-D that may be generated and/or displayed by the systems and methods described herein. Similar to image 200B illustrated in FIG. 2, images 300A-D illustrate a spyglass 304A-D that is an interface overlay that is displayed in conjunction with a first image 302. Further, each overlay 304A-D in FIGS. 3A-3D displays a second image 306A-D, respectively, inside the overlay, and also includes a localization point 308 designating a center of the localization region or neighborhood 310. As discussed further herein, a user can dynamically select at least one localization point with a computer input device, e.g., a computer mouse, touch screen and the like.

Figure 3A:
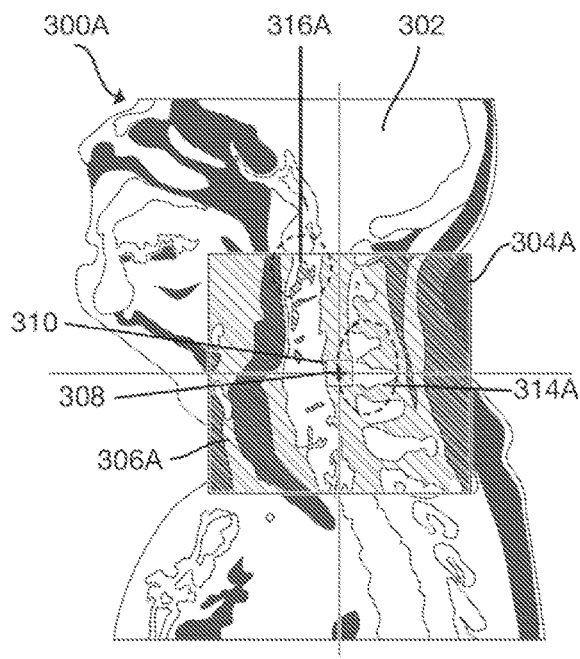
FIGS. 3A-3D are examples of software images that may be generated by the systems and methods described herein.

In FIG. 3A, the image registration engine (discussed above) calculates a first registration, e.g., a deformable registration, however, the second image 306A displays an image processed by a second registration, e.g. a best fit local rigid registration, based on the localization point 308 selected by the user. In one embodiment, the higher order, e.g. deformable, registration is approximated by the best fit local rigid registration. As discussed above, a user viewing the second image 306A can better evaluate the best fit local rigid registration on a point by point basis dynamically, e.g., continuously on the fly, and determine if the best fit local rigid registration, a surrogate for the first registration, is a sufficiently accurate registration in this area, and more specifically, whether the voxels at the localization point of the secondary and primary images correspond. For example, a user may review the second image 306A close to the localization point 308 and determine that the best fit local rigid registration has an acceptable quality. Further review of the second image closer to the square perimeter of the localization region or neighborhood 310 or even the spyglass 304A may illustrate that some of these locations have unacceptable quality, e.g., the local rigid registration may not acceptably align the source image with the target image. As discussed below, these peripheral mismatches may be in fact acceptable if the user moves the localization (point) to the previously designated unacceptable quality location and the new best fit local rigid registration displays an image having an acceptable quality registration. For example, in FIG. 3A, first region 314A (designated by a circle) of second image 306A may be determined by a user to have an acceptable/good quality and second region 316A (designated by a circle) may be determined to have unacceptable/poor quality. However, after the user moves the localization point 308 close to the second region 316A, the image registration engine/algorithm will rerun (for every move of the localization point) and the user will again determine whether the updated best lit local rigid registration displayed in the second image 306A has an acceptable quality. As discussed below, this checking of other locations can be rerun as many times as the user requires to satisfy a quality requirement. Alternative exemplary systems and methods are discussed further below.

Figure 3B:
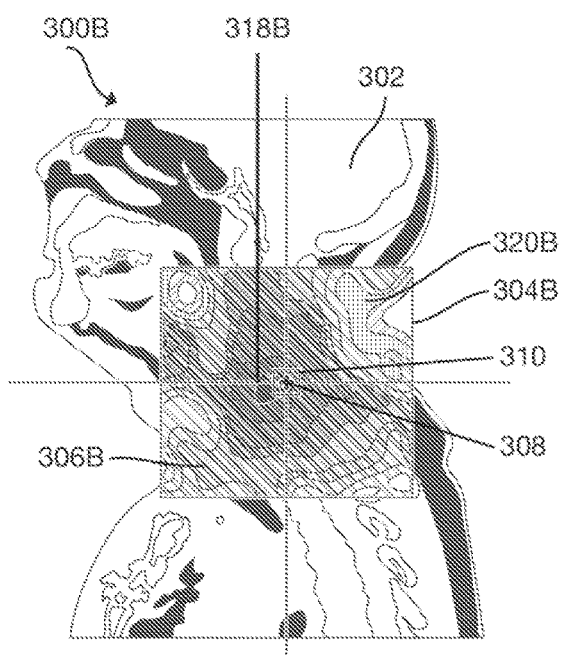

FIG. 3B is similar to FIG. 3A, except image 300B includes a second image 306B of a heat map in overlay or spyglass 304B. In this embodiment, the image system has access to a primary image, a first registration, and a number of best fit local rigid registrations). The heat map is a graphical representation shown in colors, black and white, cross hatching, another graphical representation, or the like that represents the difference between the first registration and the best fit local rigid registration, e.g., the difference in magnitude and/or direction between the registration vectors for each pixel/voxel in the first registration, e.g., a deformable registration, and the best fit local rigid registration. First region 318B (dark cross hatching) may be a region in the second image 306B where the difference between the registrations is small and second region 320B (light cross hatching) may be a region where the difference between the registrations is large. In the illustrated embodiment, the different styles of cross hatching represent different levels or groupings of differences between the registrations, for example the darkest cross hatching may represent differences between registration with a magnitude between 0 and 1 mm. As discussed above and further below, a user may elect to investigate whether the differences resolve, i.e, approach 0 in magnitude, by moving the localization point over the areas with larger differences to determine if the differences between the registrations resolve. If the differences resolve (less difference between the registrations as indicated by the heat map), then the quality of the deformable registration may be determined by the user as acceptable. If the user determines that the differences do not resolve, the user may elect to run another registration and to conduct another quality review or record areas which may not have registered accurately as described herein. Additionally, for rigid structures, such as bony anatomy, a user may elect to localize to one area in the bone and review remote areas of the same bone to determine whether the best fit local rigid registration from the first area is a good approximation also for the second area. In this case, the user may determine that the rigid bone has been registered rigidly which may generally be deemed desirable and accurate.

Figure 3C:
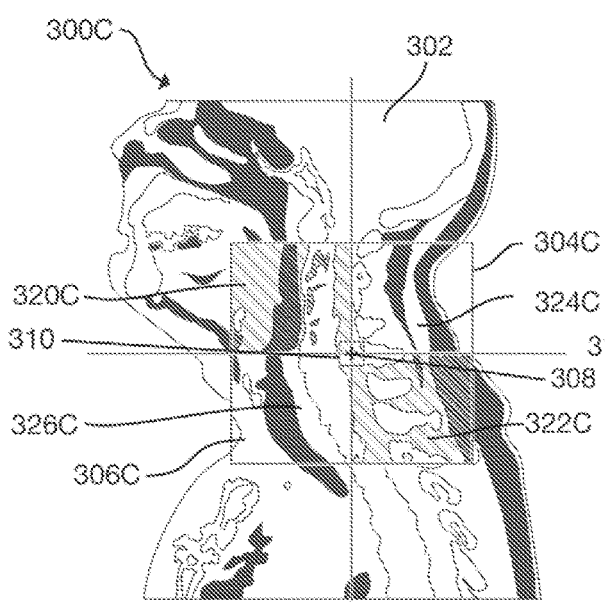

FIG. 3C is similar to FIG. 3A, except image 300C includes a second image 306C of a checkered overlay or spyglass 304C. In the illustrated embodiment, the checkered overlay or spyglass 304C includes four quadrants, including top left 320C and bottom right 322C and top right 324C and bottom left 326C. Top left 320C and bottom right 322C quadrants display an image substantially similar to a portion of the second image displayed in FIG. 3A, therefore, the top left and bottom right quadrants are displaying portions of an image processed by a second registration or a best fit local rigid registration based on the localization point 308 selected by the user. In the illustrated embodiment, top right 324C and bottom left 326C are displaying the primary image of first image 302. In another embodiment, one quadrant, three quadrants, or a number of quadrants less than a total number of quadrants display portions of an image processed by a second registration or a best fit local rigid registration. In yet another embodiment, the checkered overlay includes more than 2×2 quadrants, e.g., 2×3, 3×3, etc. Generally, the user would inspect the intersection between the quadrants to determine whether the two different images matched at these intersection lines. Wherever there is discontinuity, the registration may be deemed inaccurate, and where there are smooth continuations of anatomy from one image to the other across these quadrants, the registration may be deemed acceptable.

Figure 3D:
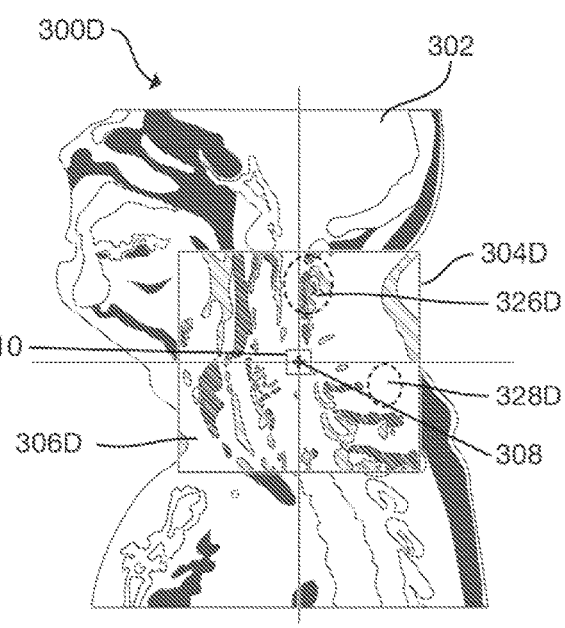

FIG. 3D is similar to FIG. 3A, except image 300D includes a second image 306D that illustrates a subtraction graphic in the overlay or spyglass 304D. In this embodiment, the system uses at least the primary image and secondary image processed through the second registration, e.g. the best fit local rigid registration, to determine a subtraction value for each image pixel or voxel, which is the difference between the primary and secondary image units at each pixel or voxel. The subtraction value is graphically represented in the second image 306D in colors, cross hatching, and/or the like. For example, first region 326D may be a region in the second image 306D where the subtraction absolute value is large, because, for example, the primary and secondary images are not accurately registered, and second region 328D may be considered a region where the subtraction absolute value is small, because, for example, the primary and secondary images are accurately registered. In the illustrated embodiment, the distinct styles of cross hatching represent different levels or groupings of subtraction values between the images, e.g., the clear or white portions of the image may represent where the absolute difference between the two images is less than 100 Hounsfield units on a Computed Tomography (CT) medical image. In another embodiment, another number and set of styles can be used to represent the levels. As discussed herein, a user may move the localization point over the image areas with larger differences to determine if the differences between the images may resolve, i.e. approach a subtraction value of 0, potentially indicating an accurate registration in these areas.

Figure 4A:
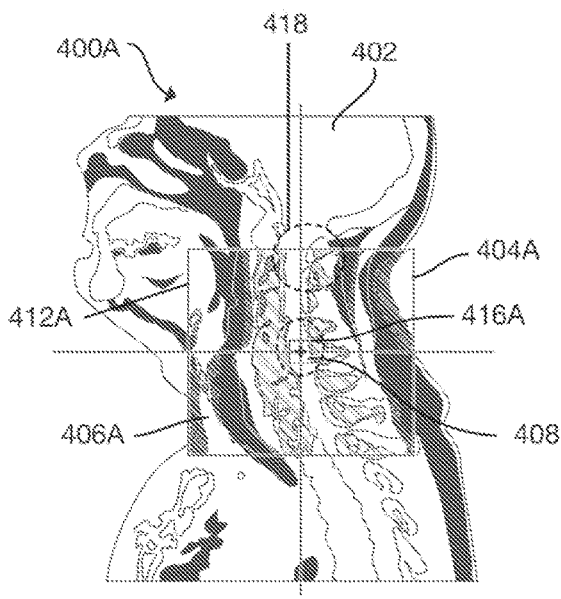
FIGS. 4A-7B are examples of additional software images that may be generated by the systems and methods described herein.
Figure 4B:
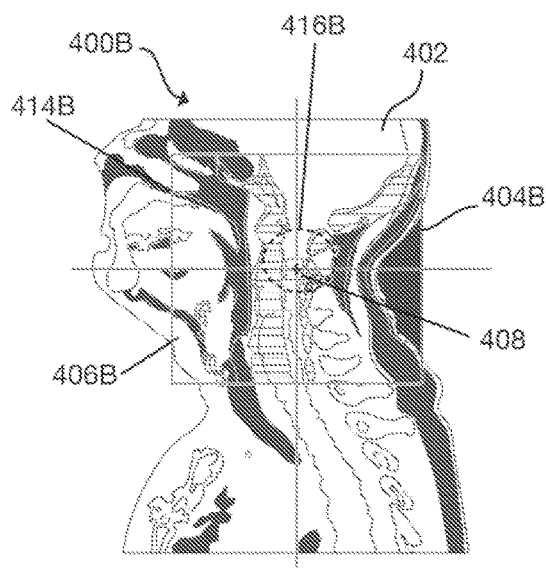

FIGS. 4A-4B illustrate a series of images 400A-B that may be generated and/or displayed by the systems and methods described herein. Similar to image 300A illustrated in FIG. 3A, images 400A-B illustrate a spyglass 404A-B that is an interface overlay that is displayed in conjunction with a first image 402. Further, each overlay 404A-B in FIGS. 4A-4B displays a second image 406A-B inside the overlay. Specifically, the second images 406A-B display a 50-50 blended image or a display of a percentage of the secondary image (50%) after applying the second registration (rigid local registration) blended with a percentage of the primary image (50%). In another embodiment, the overlay 404A-B may display a blend selected by the user, the blend being adjustable between 0-100% of the source applied to a registration over a complimentary 0-100% of the target image. Overlapping features in the blended image allow the user to determine the quality of the registration from point to point in a local area. FIGS. 4A-4B further illustrate how a user can dynamically move from one localization (point) to another. In the illustrated embodiment, the software system calculates and displays additional blended images based on additional rigid local registrations as a user moves the localization point 408 from a first region 412A of image 400A to a second region 414B of image 400B. In this embodiment, movement of the localization point 408 illustrates how a user may investigate whether the overlapping features represented in first area 416A of image 400A (area represented as a circle) improve by moving the localization point 408 up the sagittal image to the second area 418 of image 400A which corresponds to area 416B illustrated in image 400B (area also represented as a circle). As discussed herein, a user can dynamically move to as many localization points as needed, and each movement produces another rigid local registration that can be viewed by the user. As discussed herein, each registration or a portion of each registration may be marked good, poor, etc. to communicate to other users and/or to provide an input to a rerun a registration. In determining whether the registration is accurate, a user may look for sharp features in the overlapping region which appear to correspond well between the two images. In areas where sharp features are absent, a user may look for smooth transitions in the best fit local rigid registration when traversing localizations between sharp features, indicating a smooth first registration which may be deemed to be desirable in these low contrast areas of the images. In another embodiment, a local registration metric may be computed in order to score the local registration in this area and optionally presented to the user through the user interface.

Figure 5A:
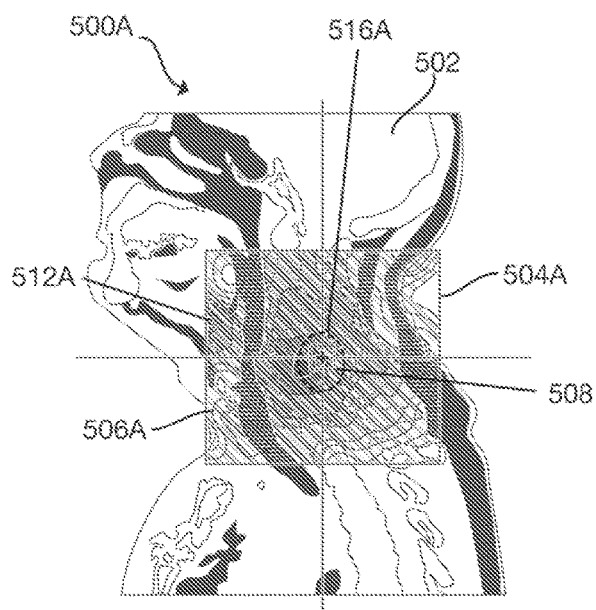
Figure 5B:
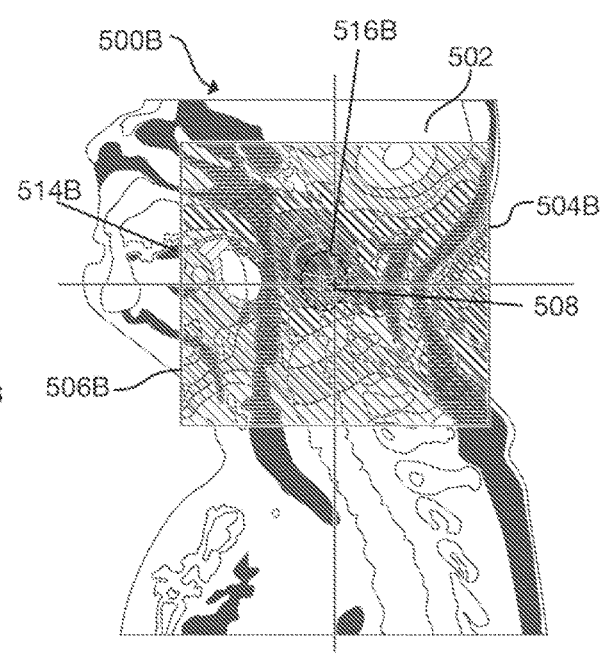

FIGS. 5A-5B illustrate a series of images 500A-B that may be generated and/or displayed by the systems and methods described herein. Similar to image 300B illustrated in FIG. 3B, images 500A-B illustrate a spyglass 504A-B that is an interface overlay that is displayed in conjunction with a first image 502. Further, each overlay 504A-B in FIGS. 5A-5B displays a second image 506A-B inside the overlay. Specifically, the second images 506A-B display a heat map and a primary image composite blended as described in reference to blending in FIGS. 4A-4B. As discussed above in reference to FIG. 3B, the heat maps displayed in FIGS.

5A-B axe graphical representations shown in colors, black and white, cross hatching, another graphical representation, or the like that represents the difference between the first registration and the second registration (e.g. best fit local rigid registration), e.g., the difference between the registration vectors for each pixel/voxel in the first registration and the second registration. Substantially similar to the example illustrated and described in FIGS. 4A-4B, a user can dynamically move the localization point 508 from a first region 512A of image 500A to a second region 514B represented in image 500B. Specifically, the images illustrate a user moving between a first localization point or area 516A in FIG. 5A to a second localization point or area 516B in FIG. 5B where a user determines if the differences shown in the heat map resolve.

Figure 6A:
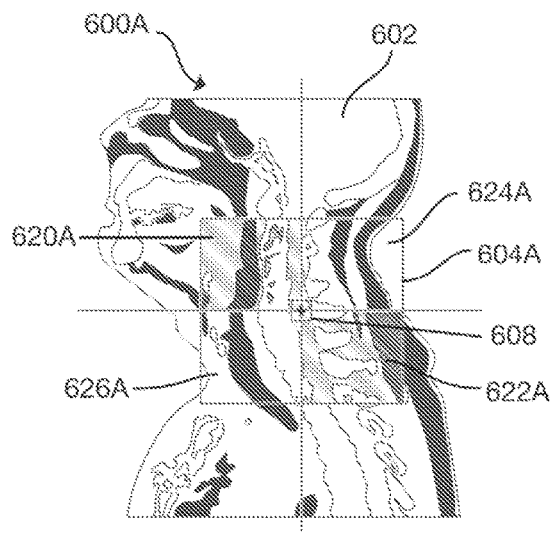
Figure 6B:
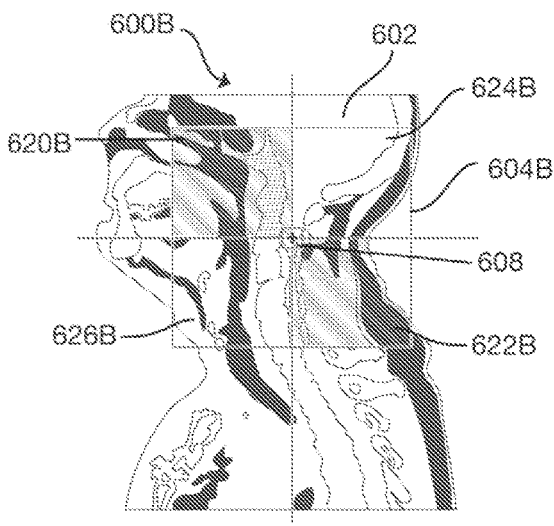

FIGS. 6A-6B illustrate a series of images 600A-B that may be generated and/or displayed by the systems and methods described herein. Similar to image 300C illustrated in FIG. 3B, images 600A-B illustrate a spyglass 604A-B that is an interface overlay that is displayed in conjunction with a first image 602 which is checkered. The checkered overlay or spyglass 604A-B includes four quadrants, including top left 620A-B and bottom right 622A-B and top right 624A-B and bottom left 626A-B. Top left 620A-B and bottom right 622A-B quadrants display an image substantially similar to a portion of the second image displayed in FIG. 4A; therefore, the top right 624A-B and bottom left 626A-B quadrants are displaying the primary image or first image 602. Similar to FIGS. 4A-4B and 5A-5B, a user can dynamically move the localization point 608 to resolve image registration issues as discussed above.

Figure 7A:
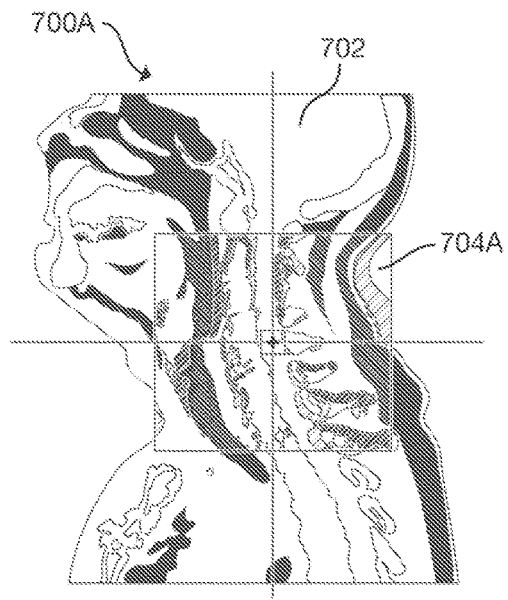
Figure 7B:
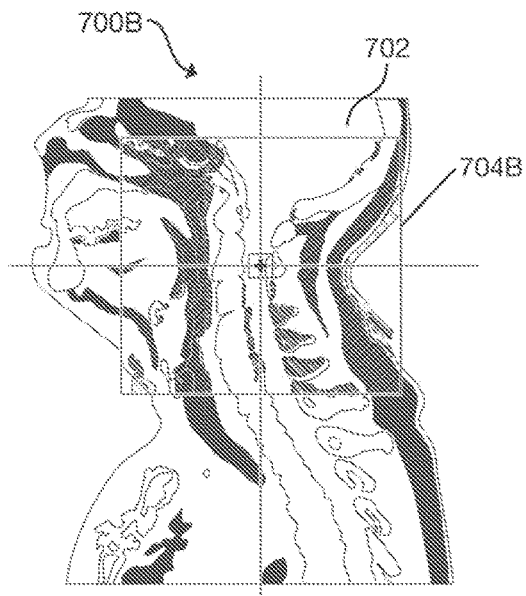

FIGS. 7A-7B illustrate a series of images 700A-B that may be generated and/or displayed by the systems and methods described herein. Similar to image 300D illustrated in FIG. 3D, images 700A-B illustrate a spyglass 704A-B that is an interface overlay that is displayed in conjunction with a first image 702 having a subtraction graphic. As discussed above, the system uses at least the primary image and secondary image processed through the second registration, e.g. the best fit local rigid registration, to determine a subtraction value for each image pixel or voxel, as described above in reference to FIG. 3D. The subtraction value is graphically represented in second image 306D in colors, cross hatching, and/or the like. Specifically, the spyglass 704A-B displays a subtraction and a primary image composite blended as described in reference to blending in FIGS. 4A-4B. Similar to FIGS. 4A-4B, 5A-5B, and 6A-6B, a user can dynamically move the localization point 708 to attempt to resolve differences between the images as discussed herein.

In another embodiment, multiple display modes may be further blended together in the spyglass. For example, the primary and secondary blend as shown in FIGS. 4A-B may be further blended with the heat map as shown in FIG. 3B.

Figure 8A:
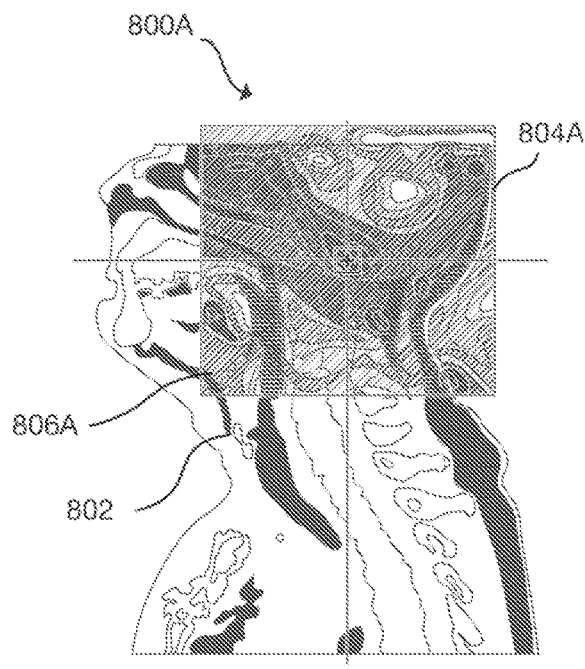
FIGS. 8A-8B are examples of software images that may be generated by the systems and methods described herein.
Figure 8B:
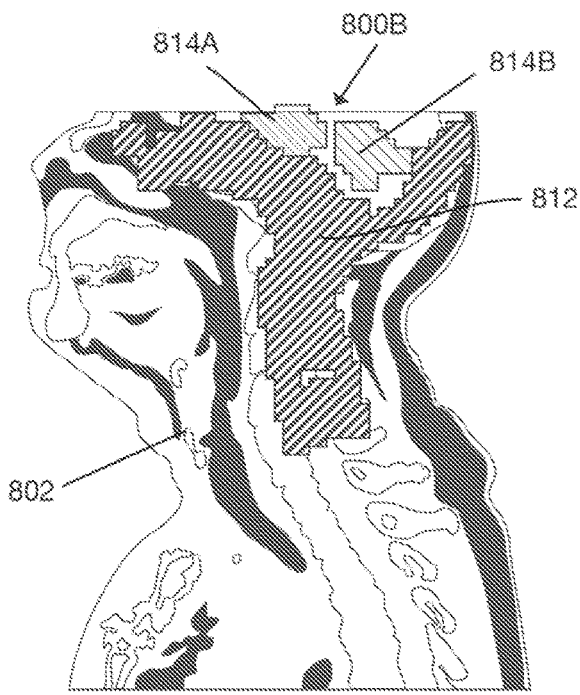

FIGS. 8A-8B illustrate a series of images 800A-B that may be generated and/or displayed by the systems and methods described herein. Image 800A displays a spyglass 804A-B that is an interface overlay that is displayed in conjunction with a first image 802 having a heat map and primary image composite 806A, for example. During review of the image 806A, a user can enter a quality rating on image 806A. For example, a user can click the right mouse button for localization points that have good quality and the left mouse button for localization points that have low quality. In other embodiments, other input mechanisms and controls can be used to track/record these user quality determinations. For example, a toggle system using a combination of keyboard or touch screen buttons (for example) may allow a user to toggle between recording modes (e.g. "good", "bad", and/or other notations or classifications, and/or instructions concerning what types of improvements are required to improve the registration in the local area under review), in order to record classifications of the local registration during registration review. During this interaction, the software and/or system tracks and/or records these inputs or modes and highlights/shades sections in the registration record, as illustrated in FIG. 8B. For example, in the illustrated embodiment, first area 812 may be designated as good quality and second areas 814A-B may be designated as poor quality. The registration algorithms may then take these or other designations as input(s) to produce another registration. For example, a registration algorithm, when executed with this input and possibly the additional input of the previous registration, may seek to maintain registration parameters from the previous registration in areas marked as "good" and seek to replace registration parameters from the previous registration in areas marked as "bad". In another embodiment, in the registration algorithm the registration parameters in "good" areas may be used to directly influence or constrain the registration parameters in the "bad" areas. In another embodiment, a user may use a touch screen to designate good and poor quality locations. In still another embodiment, the user may elect to display other spyglass modes during this recording process, such as blended overlay, subtraction, or checkered overlay. In yet another embodiment, the designation of the quality markings may be automated based on a registration rating module or engine that may consider input from a heat map, checkered overlay, and/or subtraction modules or engines.

Figure 9:
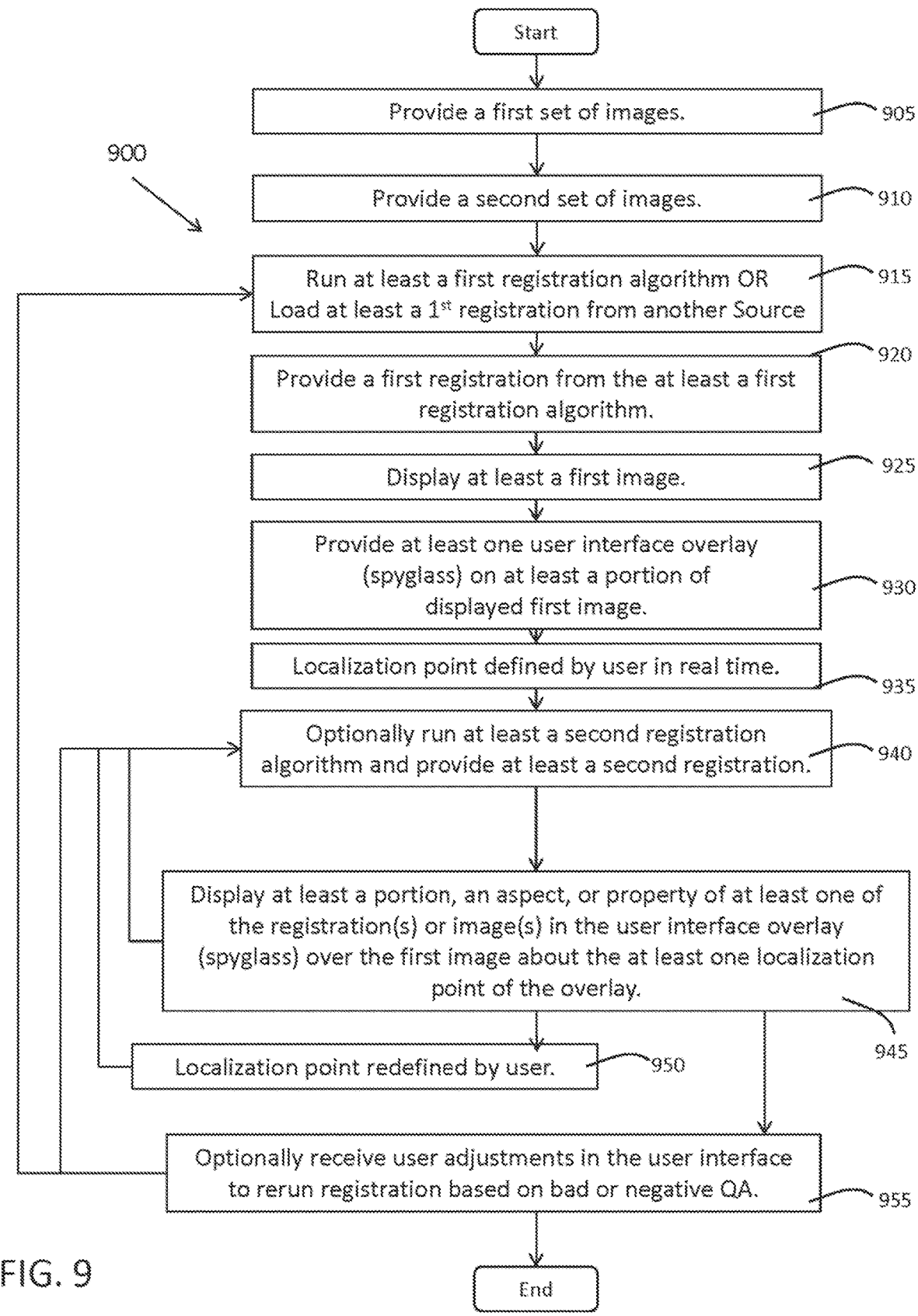
FIGS. 9-11 depict flow diagrams of example methods.

FIG. 9 is a flow diagram depicting an example method 900 for computing and/or evaluating a registration. Method 900 may be used in a system, software program, computer device, operating system, or any combination of the same. The first set of images are received or provided at 905 and a second set of images are received or provided at 910. For example, the first set of images may include the primary images and the second set of images may include the secondary images. In another embodiment, the second set of images may be optional. For example, if the first registration at 915 is loaded from another source and only registration overlays are displayed, e.g. the heat map, a second image may not be required.

Using the first set of images and the second set of images, at least a first registration algorithm runs at 915 and provides the at least first registration at 920. For example, the at least first registration may be a deformable registration. In another embodiment, a first registration may be loaded from another source, e.g., another memory location in another system. In yet another embodiment, the at least first registration is not a deformable registration. For example, the at least first registration could be a rigid registration. At least a first image is displayed at 925, at least one user interface overlay or spyglass is provided on at least a portion of the displayed image at 930, and a localization point or position is defined or selected by a user in real time at 935. At least a second registration algorithm is optionally run and at least a second registration is provided at 940. For example, at least a second registration algorithm may approximate the first registration with a best fit lower order registration; e.g., the at least a second registration may be a best fit local rigid registration. In another embodiment, the at feast second registration algorithm may approximate the first registration with a global rigid registration. As discussed above, the purpose of providing a second registration or a best fit local rigid registration is to allow the user to see at least one lower order rigid registration to help the user understand the first registration or the complex, higher order deformable registration. In another embodiment, the at least one second registration might be a registration independently computed by optimizing similarity between the primary and secondary images in a local region rather than a best fit registration which is an approximation to the first registration. This at least second registration may be a rigid registration or may be a higher order registration. In yet another embodiment, the first registration may be a lower order registration and the at least second registration may be a higher order registration computed using an algorithm to optimize the image matching between the primary and secondary images. This embodiment would enable the user to determine the quality of the lower order registration in comparison with the higher order registration which may be more accurate at very local image fitting, but may have other negative trade-offs which make it less desirable, such as inaccuracies in certain parts of the registration. In these embodiments, the purpose of the at least second registration is as a general comparison to the first registration as opposed to some embodiments where the at least second registration is used to better understand the first registration. In addition, both registrations could be scored based on their quality or other properties and this record could be fed back into a registration algorithm to regenerate a new registration.

At 945, at least a portion, an aspect, or a property of at least one registration or at least one image is displayed over the first image in the user interface overlay (spyglass) about the at least one localization point of the overlay. For example, the second image processed through second registration may be displayed in the overlay over a first image that contains a primary image (e.g., FIG. 3A). In another embodiment, the heat map described and illustrated in FIG. 3B, the checkered overlay described and illustrated in FIG. 3C, or the subtraction value graphic described and illustrated in FIG. 3D is displayed in the overlay over at least a portion of the first image. In another embodiment, another aspect or property about the first registration, the second registration, or the comparison between the at least two registrations is displayed in the overlay over at least a portion of the first image, e.g. vectors displaying the magnitude and direction of the registration(s) at each pixel or voxel or a different type of heat map which depicts a metric of the local properties of the registration, including but not limited to compressibility or an accuracy metric.

A user may redefine the localization point or position at 950, triggering the dynamic and user controlled rerunning of at least a second registration and providing at least a second registration at 940, which is then displayed over the first image in the user interface overlay (spyglass) at 945. Every time the user redefines the localization point or position at 950, the system goes through another pass at 950, 940, and 945. In another embodiment, the system may be configured (programmed) to include an automated process that triggers from 945 back to 940 to rerun the at least a second registration to provide at least a second registration at 940 (e.g. a new or updated best fit local rigid registration) that is then displayed over the first image in the user interface overlay (spyglass) at 945 to help the user evaluate the registration. At 955, user notations in the user interlace overlay or spyglass based on a bad or negative quality assurance or some other review triggers a partial rerun of the method starting at 915 where at least a first registration algorithm is reran, possibly based on these user inputs, or loaded from another system as discussed above. Alternatively, at 955, the user notations could trigger and be used as inputs for a rerun of the method starting at 940 where the at least a second registration algorithm is rerun, possibly based on these user inputs, for example to bias the registration away from had results and to results more acceptable to the user. Alternatively, after 955 the system may come to an end as illustrated in FIG. 9. In another embodiment, a software menu item or another input may trigger a partial rerun of the method starting at 915.

Figure 10:
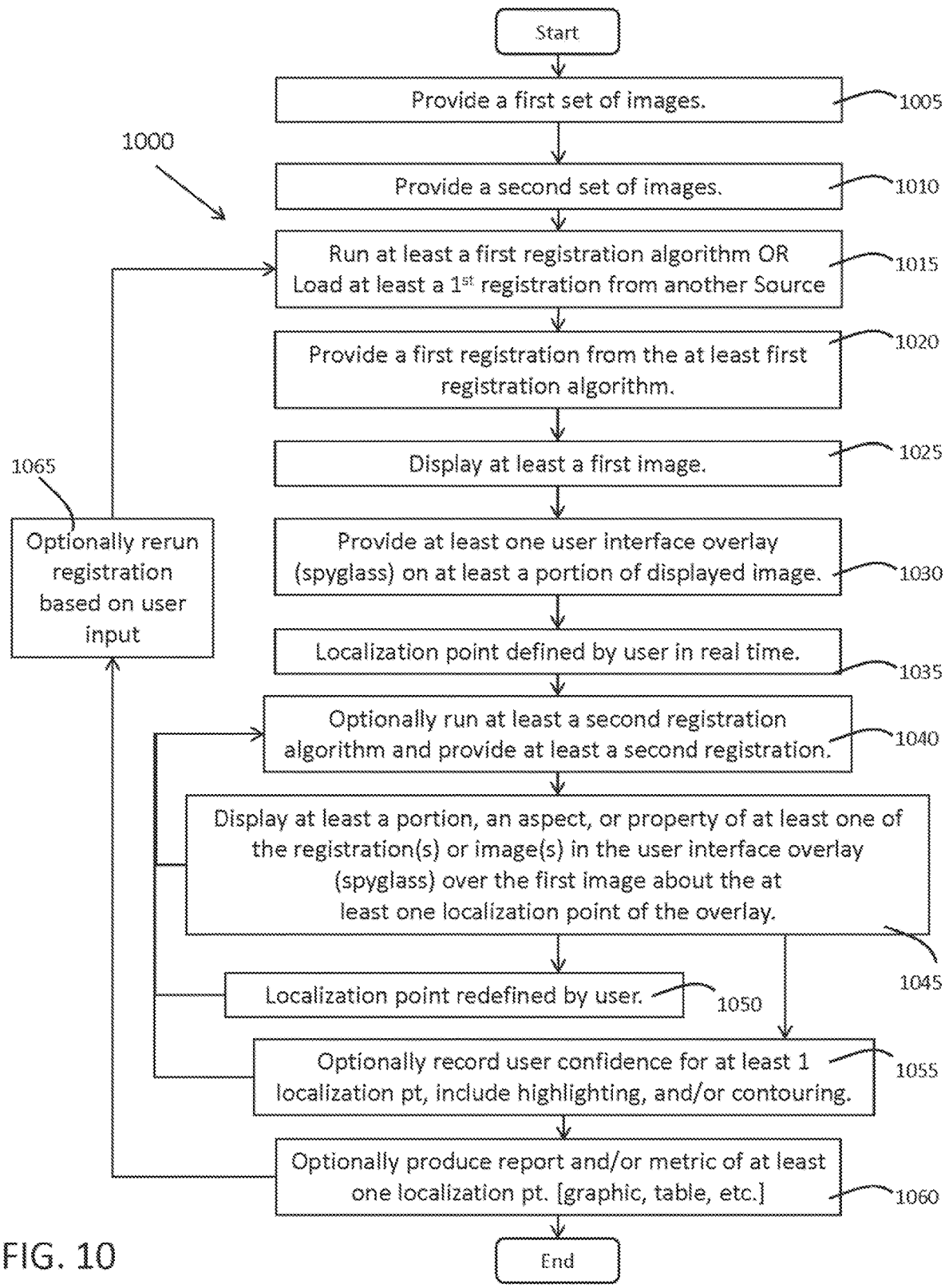

FIG. 10 illustrates another flow diagram depicting an example method 1000 for computing and evaluating a registration. Method 1000 is substantially similar to method 900 discussed above, except method 1000 includes additional quality assurance ("QA") components at 1055, 1060, and 1065. In other words, 1005, 1010, 1015, 1020, 1025, 1030, 1035, 1040, 1045, and 1050 are substantially similar to 905, 910, 915, 920, 925, 930, 935, 940, 945, and 950, respectively.

At 1045, at least a portion, an aspect, or a property of at least one registration or at least one image is displayed over the first image in the user interface overlay (spyglass) about the at least one localization point of the overlay, similar to 945 in FIG. 9. Similar to the method 900 discussed above, the system may be configured (programmed) to include an automated process that triggers from 1045 back to 1040 to rerun the at least a second registration to provide at least a second registration at 1040 that is then displayed over the first image in the user interface overlay (spyglass) at 1045 to assist the user in evaluating the registration. In addition, method 1000 includes at 1055 recording of user confidence for at least one localization point. User confidence can be recorded at 1055 as a video recording or "bird's eye" view of a user review of the overlay for at least one localization point, e.g., localization point by localization point. This record is a method whereby communication can be improved between personnel responsible for review and quality assurance of a registration (e.g., a physicist) and personnel responsible for decision-making regarding a registration (e.g., a physician). Alternatively, user confidence at 1055 can be entered on the overlay in the form of highlighting or drawing a perimeter about a portion of the image displayed in the overlay, recorded marks (positive and negative indicator's entered by the user through a mouse or another computer device input), and painting of at least a portion of a registration in the overlay or on the first image. In another embodiment, notations concerning the registration other than user confidence can also be recorded, e.g. whether a certain area should be considered a rigid structure, which might be used as an input into a registration algorithm at 1015 or 1040. In yet another embodiment, the user may interact with this registration spyglass in other ways, such as to contour (i.e., segment or outline) a structure of interest or a portion of a structure of interest based on the image(s) which are displayed, potentially dynamically, in the spyglass. For example, a local rigid registration could be interactively updated by changing the localization point and immediately used to outline a close-by and accurately registered edge of a structure in one of the images. This process could be continued until the entire structure of interest is contoured. In another embodiment, these local registrations could be composited together using a registration approximation algorithm into a single global registration, optionally considering as in input user recorded user notations about each local registration. In another embodiment, method 1000 can be completed automatically, therefore, the entire image is traversed to compute local registrations in order to composite a deformable registration.

At 1060, a report or metric of at least one localization point is produced that provides a qualitative and/or quantitative evaluation of the registration about local portion(s) of the image(s). In one embodiment, the report contains a series of captured images of reviewed localization points, each with an indication of how the registration(s) reviewed were classified by the user, e.g., as good or bad. In another embodiment, the report is at least partially comprised by a new volume that indicates the classifications which were recorded. This could be represented as a set of images similar to FIGS. 8A-B. In another embodiment, a table summarizing the recorded user classifications could be included in a report. In another embodiment, the report could be saved and loaded, including the new volume with regional classifications recorded, to be interacted with in a software system by another user, e.g., the report may be saved by a physicist and loaded and reviewed by a physician. At 1065, the method optionally reruns a registration based on user input, including, for example, the classifications described above, at 1060 and continues with the method at 1015, 1020, and the like.

Figure 11:
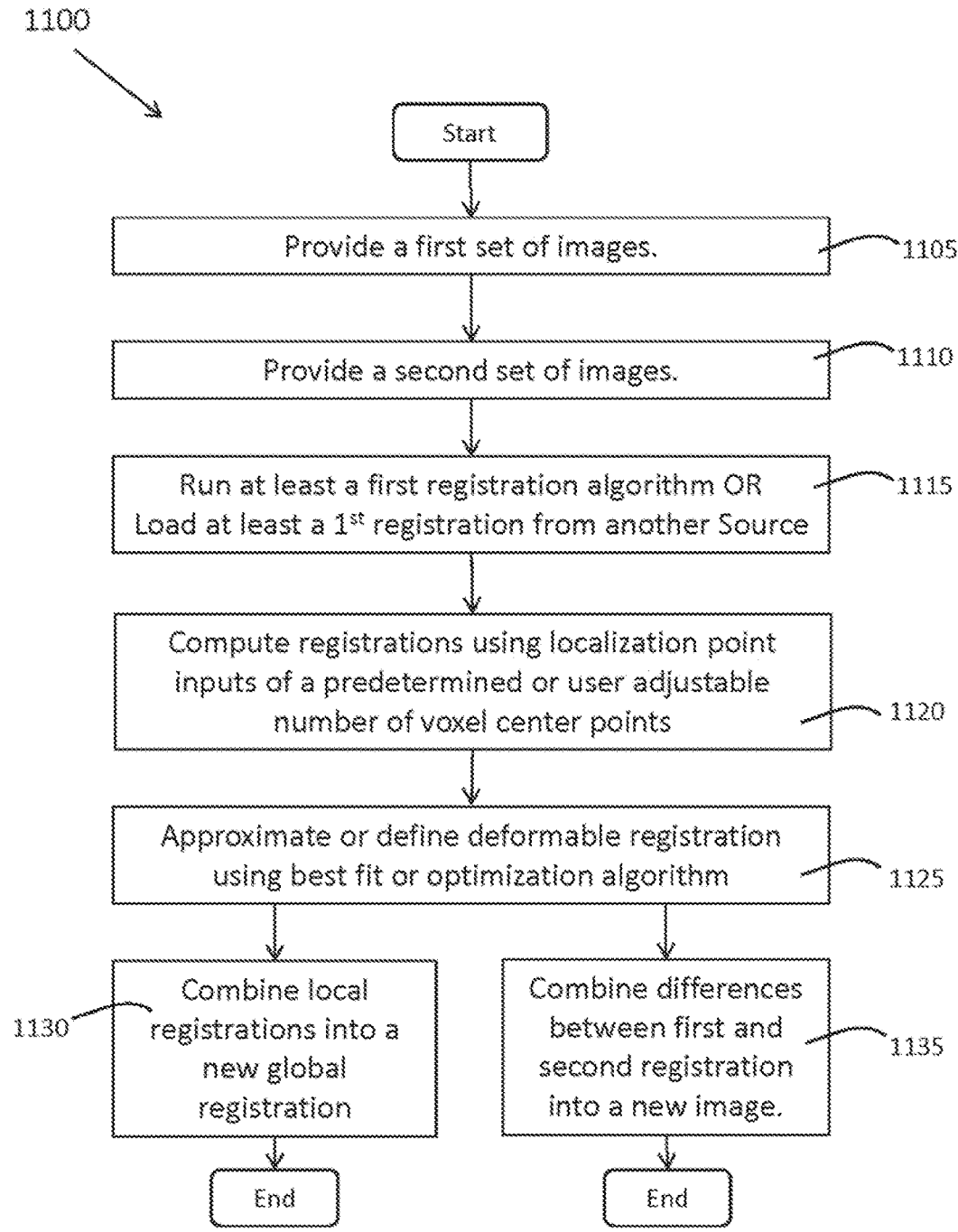

FIG. 11 illustrates yet another flow diagram depicting an example method 1100 for computing and evaluating a registration. Similar to method 900 illustrated in FIG. 9, method 1100 includes a first set of images received or provided at 1105 and a second set of images received or provided at 1110. Using the first set of images and the second set of images, at least a first registration algorithm runs at 1115. In another embodiment, a first registration may be loaded from another source, e.g., another memory location in another system. At 1120, an automated process controls the computation of registrations using localization points of a number of predetermined or user adjustable pixel or voxel locations. At 1125, the automated process approximates a best fit local registration for the first registration at each localization point. In another embodiment a second registration algorithm is executed taking the first and second set of images and optimizing their alignment to one another. From 1125, the method may include combining local registrations into a new global registration (1130) or combining differences between first and second registration into a new image (1135). In still another embodiment, a new image or volume is generated where each pixel or voxel has the value of the difference between the first registration and the second, local registration. This generates a volume analogous to the heat map previously described. In another embodiment, a new registration is generated which is a combination of each of the local computed registrations.

The embodiments of this invention shown in the drawing and described above are exemplary of numerous embodiments that may be made within the scope of the appended claims. It is understood that numerous other configurations of the graphical user interfaces may be created taking advantage of the disclosed approach. In short, it is the applicant's intention that the scope of the patent issuing herefrom will be limited only by the scope of the appended claims.

What is claimed is:

1. A method, comprising:
   utilizing a first registration between a source image and a target image to generate a second registration between the source image and the target image;
   displaying the target image on a display device;
   receiving user input indicative of at least a portion of the target image on which to display an overlay image, wherein the second registration is generated in response to the user input; and
   displaying, on the display device, the overlay image over the portion of the target image, the overlay image is generated based at least in part on the second registration between the target image and the source image.

2. The method of claim 1, wherein the overlay image comprises a portion of the source image as transformed according to the second registration.

3. The method of claim 1, wherein the overlay image indicates an accuracy of the first registration utilized to generate the second registration.

4. The method of claim 1, wherein utilizing the first registration to generate the second registration further comprises approximating the first registration to generate the second registration.

5. The method of claim 1, wherein utilizing the first registration to generate the second registration further comprising generating a best-fit local registration between the source image and target image with respect to a point of at least one of the source image or the target image.

6. The method of claim 1, further comprising:
   receiving user input indicative of a change to the portion of the target image on which to display the overlay image;
   regenerating the second registration responsive to a change of the localization point; and
   updating display of the overlay image based on the regenerating of the second registration.

7. The method of claim 1, further comprising obtaining the first registration from a data store, wherein the first registration is pre-computed.

8. The method of claim 1, further comprising receiving user input indicative of a quality of the first registration with respect to an area of at least one of the source image or the target image.

9. The method of claim 8, further comprising generating a third registration between the source image and the target image based on the user input, wherein the third registration is based at least in part on the second registration.

10. The method of claim 1, wherein the first registration is a deformable registration.

11. The method of claim 1, wherein the second registration is a rigid registration.

12. A non-transitory, computer-readable storage medium having stored thereon computer-executable instructions that, when executed by a processor of a computing device having a user interface and a display, configure the processor to:
   generate a second registration between a source image and a target image based on a first registration between the source image and the target image;
   display the target image on the display;
   receive user input via the user interface indicative of a selection of a point of the target image; and
   display an overlay image on at least a portion of the target image established by the point selected, the overlay image is generated based on the second registration with respect to the portion of the target image on which the overlay image is displayed.

13. The non-transitory, computer-readable storage medium of claim 12, wherein the overlay image indicates at least an accuracy of the first registration, between the target image and the source image, relative to the portion of the target image on which the overlay image is displayed.

14. The non-transitory, computer-readable storage medium of claim 12, further storing instructions that configure the processor to dynamically update the overlay image in response to a change of the point selected.

15. The non-transitory, computer-readable storage medium of claim 12, further storing instructions that configure the processor to dynamically generate the second registration in response to a change of the point selected.

16. The non-transitory, computer-readable storage medium of claim 12, wherein the first registration is a deformable registration and the non-transitory computer-readable storage medium further stores instructions that configure the processor to generate, using a rigid registration algorithm, the second registration as an approximation of the first registration.

17. A system, comprising:
a display;
an input device;
at least one processor; and
a memory storing computer-executable instructions that, when executed by the at least one processor, configure the processor to:

generate a rigid registration between a source image and a target image based on a deformable registration between the source image and a target image;
display the target image on the display;
receive, via the input device, user input indicative of a selection of a portion of the target image on which to display an overlay image, wherein the rigid registration is generated as a local approximation of the deformable registration within the portion of the target image selected; and
display the overlay image on the portion of the target image, the overlay image is generated based at least in part on the rigid registration between the source image and the target image.

18. The system of claim 17, wherein the overlay image comprises a portion of the source image transformed according to the rigid registration to indicate an accuracy of the deformable registration.

\* \* \* \* \*